(12) United States Patent
Kamei et al.

(10) Patent No.: US 7,415,576 B2
(45) Date of Patent: Aug. 19, 2008

(54) DATA PROCESSOR WITH BLOCK TRANSFER CONTROL

(75) Inventors: Tatsuya Kamei, Kokubunji (JP); Masayuki Ito, Kokubunji (JP)

(73) Assignee: Renesas Technology Corp., Tokyo (JP)

( * ) Notice: Subject to any disclaimer, the term of this patent is extended or adjusted under 35 U.S.C. 154(b) by 74 days.

(21) Appl. No.: 10/521,552

(22) PCT Filed: Sep. 30, 2002

(86) PCT No.: PCT/JP02/10161

§ 371 (c)(1),
(2), (4) Date: Mar. 30, 2005

(87) PCT Pub. No.: WO2004/031943

PCT Pub. Date: Apr. 15, 2004

(65) Prior Publication Data

US 2005/0172049 A1    Aug. 4, 2005

(51) Int. Cl.
*G06F 13/38* (2006.01)

(52) U.S. Cl. ................................. 711/143; 711/118

(58) Field of Classification Search .................. None
See application file for complete search history.

(56) References Cited

U.S. PATENT DOCUMENTS

| | | | | |
|---|---|---|---|---|
| 6,285,743 | B1 * | 9/2001 | Kondo et al. | 378/119 |
| 6,389,527 | B1 | 5/2002 | Raam et al. | 712/38 |
| 6,772,295 | B2 * | 8/2004 | Spencer et al. | 711/137 |
| 6,801,988 | B2 * | 10/2004 | Nagayasu | 711/154 |
| 6,925,547 | B2 * | 8/2005 | Scott et al. | 711/207 |

FOREIGN PATENT DOCUMENTS

| | | |
|---|---|---|
| EP | 0 952 428 | 10/1999 |
| JP | 4-195448 | 7/1992 |
| JP | 10-63502 | 3/1998 |
| JP | 2000-231549 | 8/2000 |
| JP | 2000-231550 | 8/2000 |

OTHER PUBLICATIONS

M. Ishikawa et al., "A Methodology of Low Power On-Chip Memory Access in Embedded Microprocessor for Mobile Applications," The Institute of Electronics, Information and Communication Engineers, vol. 102, No. 234 (ICD2002 35-45), Jul. 18, 2002, pp. 1-6.
SH7750 Programming Manual, Hitachi, Ltd., published Apr. 1998, pp. 4-9, 10-128, and 10-130.

* cited by examiner

*Primary Examiner*—Than Nguyen
(74) *Attorney, Agent, or Firm*—Miles & Stockbridge P.C.

(57) ABSTRACT

A data processor arranged so that a block transfer control unit (12) can initiate block transfer in response to the execution of a particular instruction by a CPU, in order to increase the speed and efficiency of the data transfer between a CPU-accessible internal memory (5) and an external memory (25, 26). When an address specified by the addressing field coincides with an address mapped to the internal memory, the particular instruction sets a logical address as one of the transfer source or transfer destination addresses of the data block transfer. The internal memory is allotted to a part of virtual address space; the internal memory allotted so is associated with the physical address space, to which the external memory set as the other address is allotted, by a process in which a TLB is used when the MMU is in ON, and a given register is used when the MMU is in OFF.

5 Claims, 9 Drawing Sheets

DATA PROCESSOR WITH BLOCK TRANSFER CONTROL

FIELD OF THE INVENTION

The present invention relates to a data processor having an internal memory accessible by a CPU (Central Processing Unit), especially to block transfer control of the internal memory, and it relates to a technique useful when it is applied to, for example, a microprocessor having cache memories, which makes the internal memory a cache non-object.

BACKGROUND OF THE INVENTION

In regard to a microprocessor, it is common that a cache memory is incorporated therein for the purpose of increasing its memory access performance. However, the cache memory is suitable for handling an instruction or data, which is frequently accessed, but not so effective for data which is made unnecessary once it has been used. While a large volume of temporary data like this is often handled in the applications such as image processing or voice processing, trying using a cache memory to access these data will drive out data more suitable for the cache memory, which should be normally cached therein, because of the finite capacity of the cache memory, reducing the efficiency as a whole. Therefore, it is desired in order to these data at a high speed to have an internal memory in addition to the cache memory.

In the case where a cache memory is used, the average access performance from a CPU (Central Processing Unit) can be improved, but the cache memory changes in hit/miss depending on its access history until then, which makes difficult to predict the execution time. Therefore, the cache memory can be not appropriate for precise real time control in some cases. In an application such as real time control, it is desired to store a memory information (an instruction or data) in not a cache memory but a permanent internal memory.

In the case where a microprocessor has an internal memory according to the forementioned standpoint instead of or in addition to the cache memory, it is important to increase the speed and efficiency of the data transfer between the internal memory and external memory.

According to the consideration of the inventor, transfer control by a DMAC (direct memory access controller) is conducted in block transfer and the CPU in the middle of a transfer operation is able to carry out another process, which offers a good transfer efficiency. However, it has been shown that such transfer control requires to synchronize the action of the DMAC with the process by the CPU (in settings of a data transfer condition, and startup and termination waits) and as such, the overhead owing to the synchronization is made remarkable especially when a transferred volume is small. Also, in the case where a block transfer instruction is used, when the period of time during which the CPU is occupied by the transfer process is prolonged, the overhead is made longer as in the case of using a DMAC. If such block transfer instruction is dedicated, it becomes easy to optimize the process, but there may be the following case: a new instruction code cannot be added, or the addition of a new instruction code poses a disadvantage.

The following document has been found from the patent search, which was made after the invention was completed. In JP-A-2000-231550, it is described that a microcomputer having a load/store instruction executing unit capable of executing a load/store instruction is provided with a RAM (Random Access Memory) which data can be read out from and written in by the load/store instruction executing unit and which allows DMA (Direct Memory Access) transfer between RAM and an external memory. The forementioned Patent Gazette says that a dedicated block transfer instruction or the like may be used to access a RAM used for a special application other than cache instead of the load/store instruction (in the paragraph No. 76). However, there is no disclosure about the operation according to the block transfer instruction.

SUMMARY OF THE INVENTION

It is an object of the invention to provide a data processor, which can increase the speed and efficiency of the data transfer between a CPU-accessible internal memory and an external memory.

It is another object of the invention to provide a data processor having a CPU-accessible internal memory in addition a cache memory, which can realize speedup of data transfer between the internal memory and an external memory and a higher efficiency thereof.

It is another object of the invention to provide a data processor which can settle the following problems concerning data transfer between a CPU-accessible internal memory and an external memory: the CPU has to capture transferred data in the case of the transfer according to a load/store instruction, during which the CPU cannot perform another process; and a small transfer volume increases the overhead owing to the synchronization in the case of the transfer according to a DMAC.

The above and other objects of the invention and a novel feature thereof will be apparent from the following descriptions and the accompanying drawings hereof.

[1] First, Representative Aspects of the Invention Herein Disclosed will be Outlined Here.

In order to increase the speed and efficiency of the data transfer between a CPU-accessible internal memory and an external memory, the data processor is so arranged that the block transfer can be initiated by a particular instruction from the CPU. The particular instruction has an addressing field, and is intended to use an address specified by the addressing field as one of transfer source and transfer destination addresses of the data block transfer when the specified address coincides with the address mapped to the internal memory. The other address of the data block transfer is the address of the external memory, for example. The address of the external memory is not specified by a direct instruction, and it can be obtained through address translation with respect to the description in the addressing field or the like, as described later. In the case where the internal memory is provided in the same hierarchy as that of the cache memory, a prefetch or writeback instruction prepared for prefetch or writeback of the cache memory is diverted for the above-mentioned particular instruction. The prefetch and writeback instructions for the cache memory are triggers for block transfer, and therefore the CPU can execute an instruction subsequently even after the transfer has been started. The addressing mode of the prefetch instruction for the cache memory is e.g., register-indirect; if cache miss is detected with respect to an address which a general purpose register specified by the instruction holds, the data at the accessed address is filled in the cache memory (data corresponding to one entry is written). The writeback instruction causes cache entry data associated with cache hit to undergo write back (to be written back) when cache hit is detected with respect to an address that the general purpose register specified by the instruction holds and its cache entry is dirty, for example.

During execution of the particular instruction for which the prefetch or writeback instruction is diverted, the internal memory is a cache non-object. For example, in this time, the internal memory set as the one address is allotted to a part of virtual address (logical address) space; the internal memory allotted so is associated with the physical address space, to which the external memory set as the other address is allotted, by a process in which a TLB (address translation buffer) is used to perform address translation of the address of the internal memory when the MMU (memory management unit) is in ON, and a given register is used to perform the address translation when the MMU is in OFF. The particular instruction for which the prefetch or writeback instruction is diverted has an operation code identical with that of the prefetch or writeback instruction. Whether the operation code acts in the form of an operation on the cache memory or acts in the form of an operation on the internal memory depends on a virtual address provided by a general purpose register of the CPU when the instruction is executed. In short, the former case takes place when the address field specifies a cache object area (cachable area); the latter case takes place when the address field specifies a cache non-object area (noncachable area). On decrypting the particular instruction, the CPU issues an access command for block transfer control to the control unit capable of controlling the block transfer of the internal memory based on the result of the decryption. According to the particular instruction for which the prefetch instruction is diverted, the destination address is e.g., a virtual address specified by the instruction, and the source address is a physical address resulting from the use of a TLB with respect to the address value specified by the instruction. In contrast, according to the particular instruction for which the writeback instruction is diverted, the source address is e.g., a virtual address specified by the instruction, and the destination address is a physical address resulting from the use of the TLB with respect to the address value specified by the instruction. In the block transfer control, the addresses other than leading addresses of the transfer source and transfer destination addresses are produced by the incrementation or decrementation in the control unit.

The above-described means allows the data transfer between the internal memory and external memory to be speeded up. When the block transfer size is 32 bytes, the conventional transfer according to a CPU instruction has required that a 32-bit transfer instruction be executed sixteen times (i.e., eight times for loading and eight times for storing), in order to transfer e.g., 32-byte data, whereas the forementioned means allows such transfer to be carried out by one instruction. Thus, the program description, which requires the data transfer between the internal memory and external memory, can be made shorter. Further, a DMAC is not required for such block transfer and as such, the overhead owing to the synchronization is not increased regardless of whether the transfer volume is large or small. Therefore, it is possible to increase the speed and efficiency of data transfer between a CPU-accessible internal memory and an external memory.

The internal memory may be divided into a plurality of memory mats (pages), thereby making possible to accept an access to a different page from the CPU during the execution of block transfer to a certain page. Thus, the CPU is allowed to freely access the different page during the execution of block transfer to the certain page and as such, the effect of optimization of a program such as software pipeline processing is enhanced.

Further, the operation code of the particular instruction for initiating the block transfer is the same as that of the instruction for prefetch (or writeback) of the cache memory and as such, the selection as to whether to use the cache memory or internal memory in preparing a program can be made easily by utilizing a TLB to associate a virtual address with a physical address as is the case with respect to a usual external memory. This is because such selection requires only setting the virtual address which a program accesses to a cachable area or noncachable area. Therefore, it is also easy to change the virtual address which the program accesses between a cachable area and a noncachable area according to the result of the program debug or system debug.

According to the above data processor, an arrangement suitable for handling of streaming data such as a picture image and sound can be obtained. Thus, it becomes possible to conduct e.g., a process which could be realized by only a 100-MHz operation in the past with a lower frequency, and therefore the reduction in power consumption can be made. From the viewpoint of reducing an area, it is also possible to omit the DMAC which has been mounted conventionally. By omission of the DMAC, the speed and efficiency of data transfer between a CPU-accessible internal memory and an external memory can be increased even with a smaller area.

[2] Individual Embodiments of the Invention will be Described in Detail. The Data Processor has:

a CPU;

an internal memory accessible by the CPU; and a control circuit capable of responding to a particular access request issued by the CPU to control a block transfer, in which the internal memory is used as one transfer object, wherein a set of instructions for the CPU includes a particular instruction for making the CPU issue the particular access request, the particular instruction has an addressing field, and when an address specified by the addressing field coincides with an address mapped to the internal memory, the address is set as one of transfer source and transfer destination addresses of the block transfer.

The other of the transfer source and transfer destination addresses of the block transfer is, for example, a physical address corresponding to a logical address held by the addressing field or a physical address held by a register. For example, the register is mapped to an address space of the CPU and so arranged that it can be set by the CPU. Considering an external bus access, the data processor may has a bus interface controller connected to the control circuit, wherein the bus interface controller may perform interface control of the other transfer object of the block transfer.

In the case of the data processor having a cache memory, the cache memory may share a first bus with the CPU, internal memory, and control circuit. It is preferable from the standpoint of data processing that the internal memory is assigned a cache non-object address for the cache memory. In this case, the data processor may have a second bus used exclusively for connecting the control circuit with the internal memory, wherein the second bus can be utilized for data block transfer in response to the particular access request. During the time the control circuit is carrying out the block transfer with respect to the internal memory, the CPU can access the cache memory through the first bus. The control circuit may perform memory control in regard to a cache hit and cache miss with respect to the cache memory.

Now, it is noted that the operating instructions of the cache memory are diverted for the particular instruction. For example, first and second cache memory-operating instructions are inverted. The first cache memory-operating instruction causes an operation of writing data form the outside into the cache entry associated the cache miss with respect to the data at the cache object address specified by the addressing field. The second cache memory-operating instruction causes an operation of writing back the cache entry when a cache hit is detected at a cache object address specified by the addressing field and a cache entry associated with the cache hit is dirty. In this time, the particular instruction has an operation code identical with that of the first cache memory-operating instruction, and sets the cache non-object address of the addressing field as the destination address. Otherwise, the particular instruction has an operation code identical with that of the second cache memory-operating instruction, and sets the cache non-object address of the addressing field as the source address.

The data processor may have a DMAC connected with the bus interface controller. Also, the data processor may have an external interface circuit for connection of an external bus, which is connected with the bus interface controller.

DETAILED DESCRIPTION OF THE PREFERRED EMBODIMENTS

Figure 1:
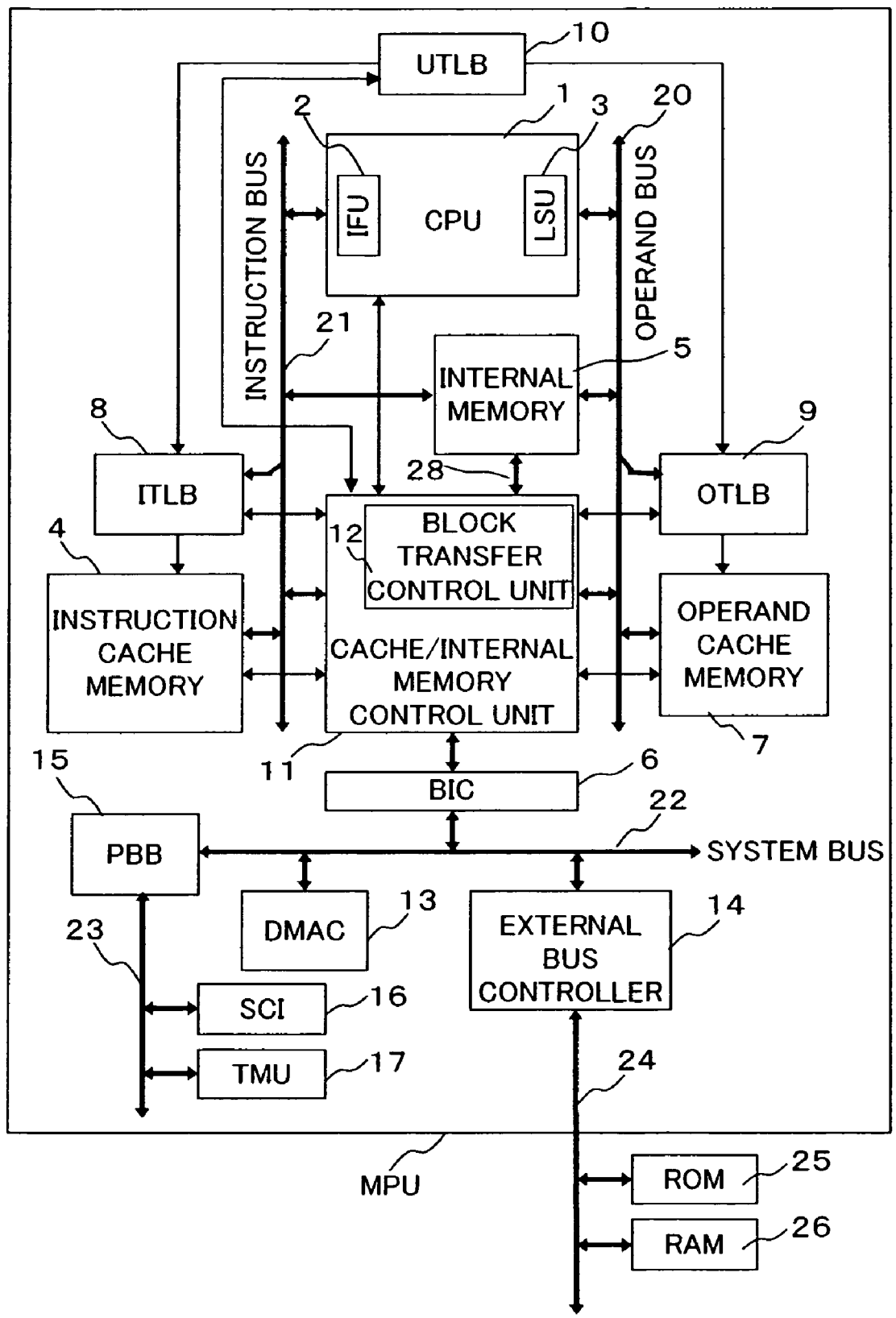
FIG. 1 is a block diagram showing a microprocessor as an example of a data processor according to the invention.

A microprocessor is shown as an example of a data processor according to the invention in FIG. 1. The microprocessor MPU illustrated in the drawing has a central processing unit (CPU) 1; the CPU 1 is connected to an instruction bus 21 through an instruction fetch unit (IFU) 2 and connected to an operand bus 20 through a load/store unit (LSU) 3. To the instruction bus 21 are connected an instruction cache memory 4 and an address translation buffer for instruction (ITLB) 8. To the operand bus 20 are connected an operand cache memory 7 and an address translation buffer for operand (OTLB) 9. A unified address translation buffer (UTLB) 10, which is positioned as a secondary cache of the ITLB and the OTLB 9, is provided. To both the instruction bus 21 and operand bus 20, there are connected an internal memory 5 and a cache/internal memory control unit 11 as a control unit.

The cache/internal memory control unit 11 is connected to a system bus 22 through a bus interface controller (BIC) 6. To the system bus 22 are connected a direct memory access controller (DMAC) 13, a peripheral bus bridge circuit (PBB) 15, and an external bus controller 14. To the peripheral bus bridge circuit (PBB) 15, there are provided, through a peripheral bus 23, a serial communication interface controller (SCI) 16, a timer unit (TMU) 17, etc. To the external bus controller 14 are connected a read only memory (ROM) 25 and a random access memory (RAM) 26 through an external bus 24. In addition, although not shown in the drawing, an ASIC may be connected through the external bus and a memory, etc. may be connected through a PCI interface.

The CPU 1 includes the instruction fetch unit 2 for issuing an instruction fetch to the instruction bus 21 and the load/store unit 3 for issuing an access to the operand bus 20 when a load/store instruction is executed. In addition, the CPU 1 has an instruction flow unit, an execution unit, and a floating-point unit, which are for performing processes of decode, exectution, scheduling, etc. of an instruction, and which are omitted in the drawing. The microprocessor MPU executes an instruction by pipelining and carries on processing in pipeline stages, e.g., instruction fetch, decode, execution, and memory access. The scheduling of the execution of the pipeline stages is controlled by the instruction flow unit. Further, the CPU 1 can output a control signal such as an exception handling signal to the cache/internal memory control unit.

The access destination of an instruction fetch request issued by the instruction fetch unit 2 depends on virtual addresses. There can be the following cases respectively: the instruction cache memory 4 is accessed; the internal memory 5 is accessed; and the system bus 22 is directly accessed through the bus interface controller 6.

The access destination of an operand access request issued by the load/store unit 3 depends on virtual addresses as in the case of the instruction fetch. There can be the following cases: the operand cache memory 7 is accessed; the internal memory 5 is accessed; the system bus 22 is directly accessed through the bus interface controller 6.

Both the addresses of the instruction bus 21 and operand bus 20 are virtual addresses, while the address of the system bus 22 is physical address. As for the translation from the virtual address to the physical address, the translation from the instruction bus 21 is performed by the ITLB 8, and the translation from the operand bus 20 is carried out by the OTLB 9. Both the ITLB 8 and the OTLB 9 are so-called micro TLBs which are caching frequently-referenced some entries in the UTLB 10.

The cache/internal memory control unit 11 controls the ITLB 8, instruction cache memory 4, OTLB 9, operand cache memory 7, UTLB 10, and internal memory 5 in response to changes in the instruction bus 21 and the operand bus 20. The cache memories 4, 7 each have an associative memory structure of direct mapping or set associative type; they are indexed by logical addresses and the comparisons of tags are performed with respect to the physical addresses resulting from the translation by the TLBs. In fact, pieces of tag information that the cache memories 4, 7 hold is regarded as pieces of physical address information.

In the cache/internal memory control unit 11, there is provided a block transfer control unit 12. When a block transfer command for the internal memory 5, instruction cache memory 4, or operand cache memory 7 is issued to the operand bus (first bus) 20, the block transfer control unit 12 controls the block transfer. Detail of the block transfer control will be described later.

The internal memory 5 can treat an access from the instruction bus 21, an access from the operand bus 20, an access from the block transfer control unit 12, and an access through the BIC 6 from the system bus 22. The internal memory 5 is connected to the cache/internal memory control unit 11 through a dedicated bus (second bus) 28. The dedicated bus 28 is used by the block transfer control unit 12 exclusively for block transfer in which the internal memory 5 is used as the transfer source or transfer destination. The internal memory 5 is divided into a plurality of pages; each page can operate independently. Detail of this will be described later.

The DMAC 13 is capable of accessing the internal memory 5 through the BIC 6, and controlling the transfer between external memories 25, 26 controlled by the external bus controller 14 and the internal memory 5. When the DMAC 13 is used to control the transfer between the internal memory and external memories, it is required that the CPU 1 executes an instruction to provide an address register, a transfer count register, a control register, etc. in the DMAC 13 with transfer condition settings.

In contrast, when the block transfer control unit 12 is used to control the transfer between the internal memory 5 and the external memories 25, 26, the CPU 1 only has to execute a particular instruction to issue a particular access command to the block transfer control unit 12 through the operand bus 20. The above-described block transfer control according to the particular instruction will be described below.

Figure 2:
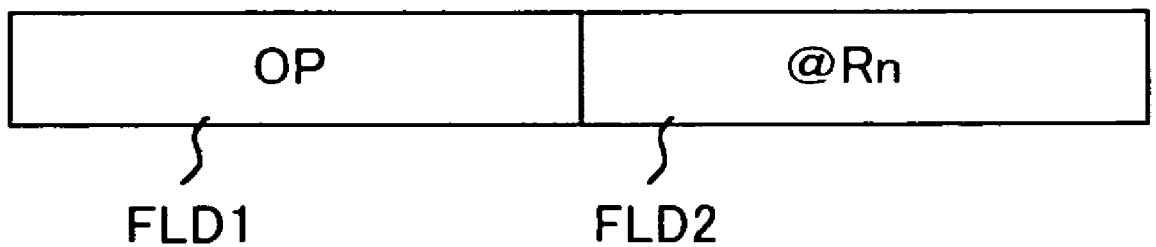
FIG. 2 is an illustration exemplarily showing an instruction format of a particular instruction.

The particular instruction is an instruction having a field FLD1 of specifying an operation code (OP) and an addressing field FLD2 as exemplarily shown in FIG. 2, which makes an address specified by the addressing field FLD2 an address for either a transfer source or transfer destination of the data block transfer when the address specified by the addressing field FLD2 agrees with an address mapped in the internal memory 5. In the microprocessor MPU, the internal memory 5 is provided in the same hierarchy as that of the cache memory 7 and as such, a prefetch and writeback instructions prepared for prefetch and writeback of a cache memory may be diverted for the particular instruction.

Figure 3:
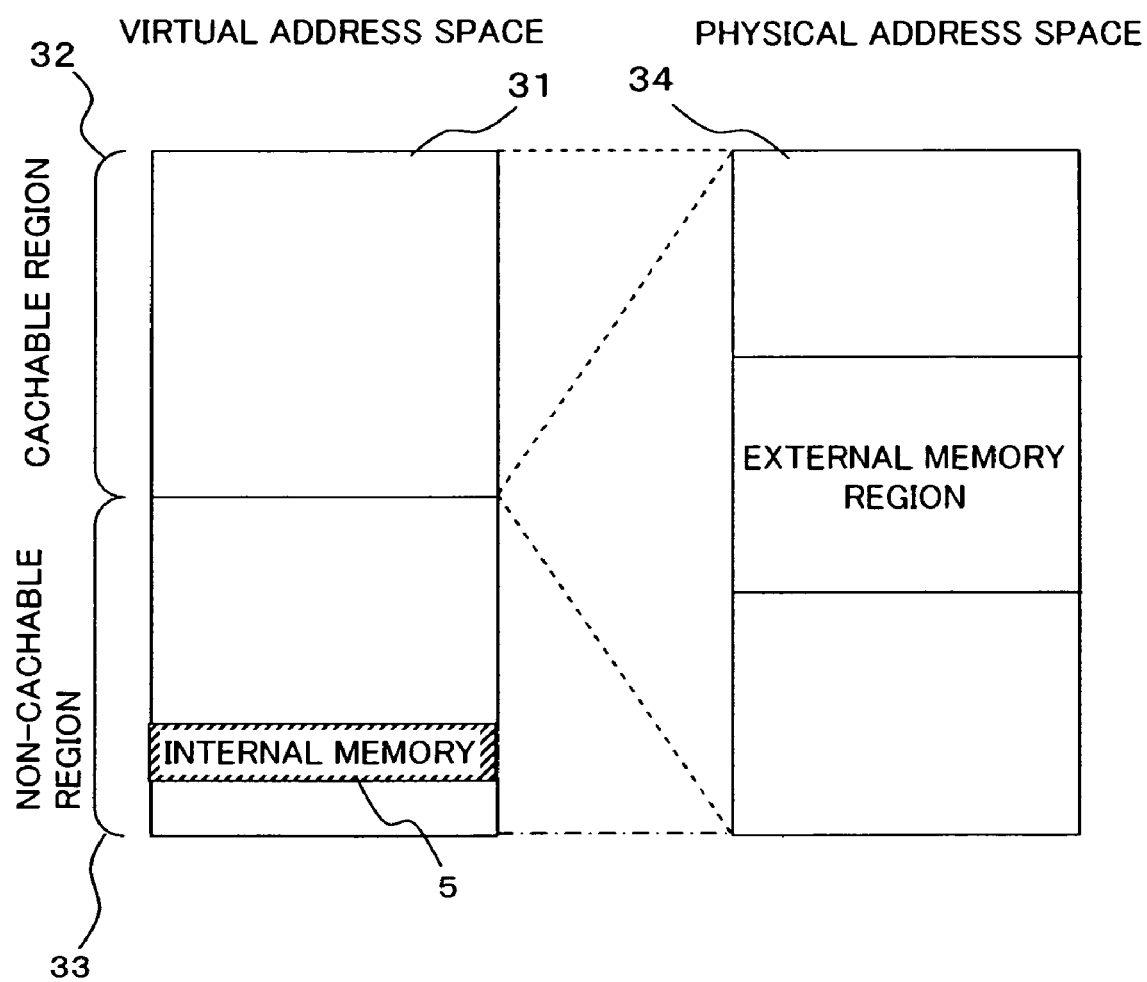
FIG. 3 is an address map exemplarily showing an address space of the microprocessor MPU.

FIG. 3 shows an address spaces of the microprocessor MPU exemplarily. The virtual address space 31 is composed of a cachable region (cachable area) 32 and a non-cachable region (non-cachable area) 33. The internal memory 5 is mapped in a part of the non-cachable region 33.

The prefetch and writeback instructions for cache memory are triggers for block transfer and as such, the CPU 1 can subsequently execute an instruction even after the transfer has been started. For example, the addressing mode of the prefetch instruction is e.g., the register-indirect (@Rn); if cache miss is detected with respect to the address of a cache area which a general purpose register (Rn) specified by the instruction holds, the data at the accessed address is filled in the cache memory. In regard to the writeback instruction, for example, if cache hit is detected with respect to the address of a cachable area which a general purpose register specified by the instruction holds, and the cache entry thereof is dirty, the cache entry data in connection with the cache hit is written back.

The prefetch and writeback instructions can be used as the above-described particular instruction in the condition that the address register-indirectly specified is the address of a noncachable area. Also, the particular instruction can be herein referred to as a prefetch instruction (also described as PREF instruction) or a writeback instruction (also described as OCBWB instruction). The transfer destination address of the PREF instruction for access to the internal memory 5 and the transfer source address of the OCBWB instruction are directed by the virtual addresses provided by the general purpose registers Rn specified by addressing fields of the instructions.

The transfer source address of the PREF instruction and the transfer destination address of the OCBWB instruction must direct an external memory. In other words, they need to direct parts of the physical address space 34 in FIG. 3.

Figure 4:
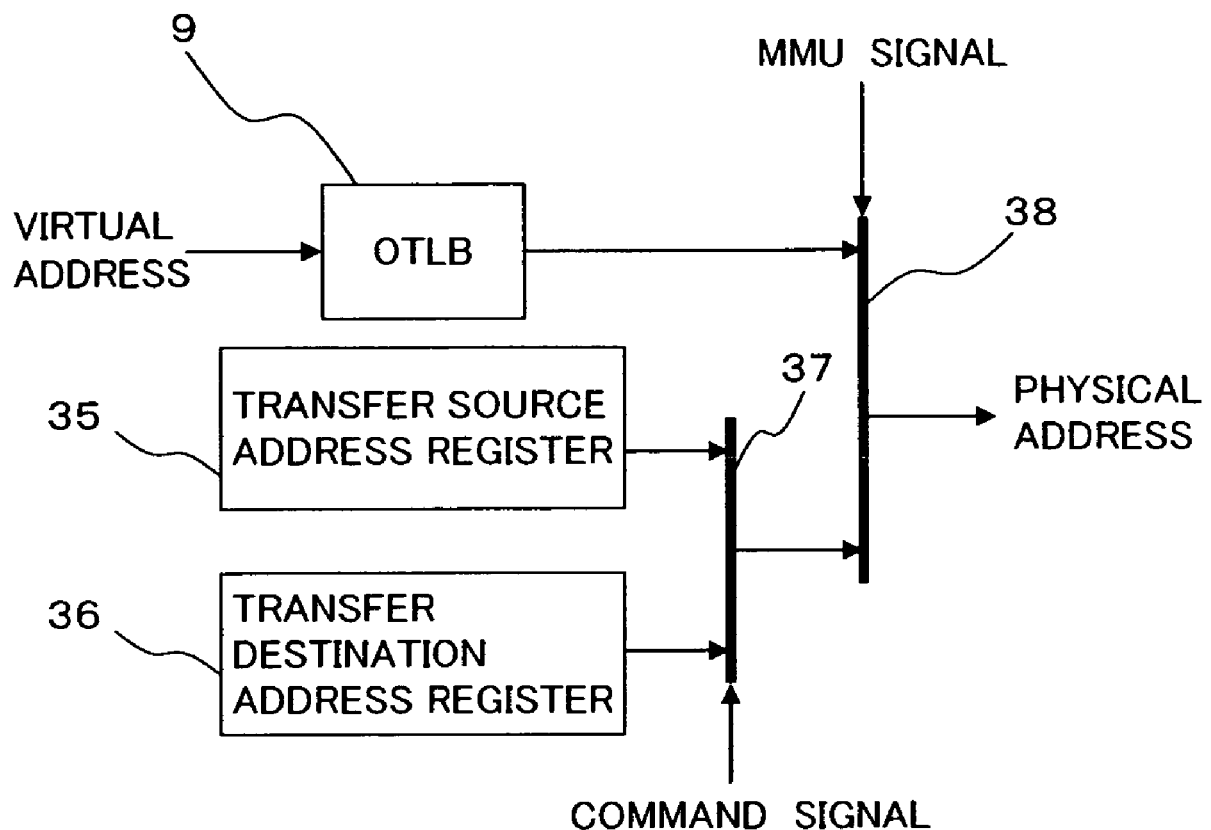
FIG. 4 is a block diagram exemplarily showing a physical address-generating means for specifying a physical address through a process according to a particular instruction.

A physical address-generating means for specifying such physical address is shown in FIG. 4. When a MMU (memory management unit) signal is ENABLE, the virtual address issued together with the PREF instruction or OCBWB instruction by the CPU 1 to the operand bus 20 is translated into a physical address by the OTLB 9. The physical address makes a transfer source address in a case of the PREF instruction and makes in a case of the OCBWB instruction, and then the transfer is performed.

When the MMU signal output based on the MMU action information initially set in a register in the cache/internal memory control unit 11 is DISABLE, the value in the transfer source's address register 35 is selected for the physical address of the transfer source of the transfer according to the PREF instruction. Also, the value in the transfer destination's address register 36 is selected for the physical address of the transfer destination of the transfer according to the OCBWB instruction.

As a result of the decryption of the particular instruction, the selector 37 is controlled by a command signal based on the result of the decryption so as to select the output from the register 35 when the instruction is an access command which responds to the PREF instruction and to select the output from the register 36 when the instruction is an access command which responds to the OCBWB instruction. The selector 38 selects the output from the selector 37 when the MMU signal is DISABLE, and selects the output from the OTLB 9 when it is ENABLE.

Thus, the particular instruction for which the prefetch instruction or the writeback instruction is diverted has an operation code identical with that of the prefetch or writeback instruction. Whether the operation code acts in the form of an operation on the cache memory or acts in the form of an operation on the internal memory depends on a virtual address provided by a general-purpose register in the CPU 1 when the instruction is executed. In short, the former case takes place when the address field FLD2 specifies a cache object area (cachable area); the latter case takes place when the address field FLD2 specifies a cache non-object area (noncachable area). On decrypting the particular instruction, the CPU decrypts issues an access command for block transfer control to the block transfer control unit 12 capable of controlling the block transfer of the internal memory 5 based on the result of the decryption.

In the block transfer control, the addresses other than leading addresses of the transfer source and transfer destination addresses are produced by the incrementation or decrementation in the block transfer control unit 12.

Figure 5:
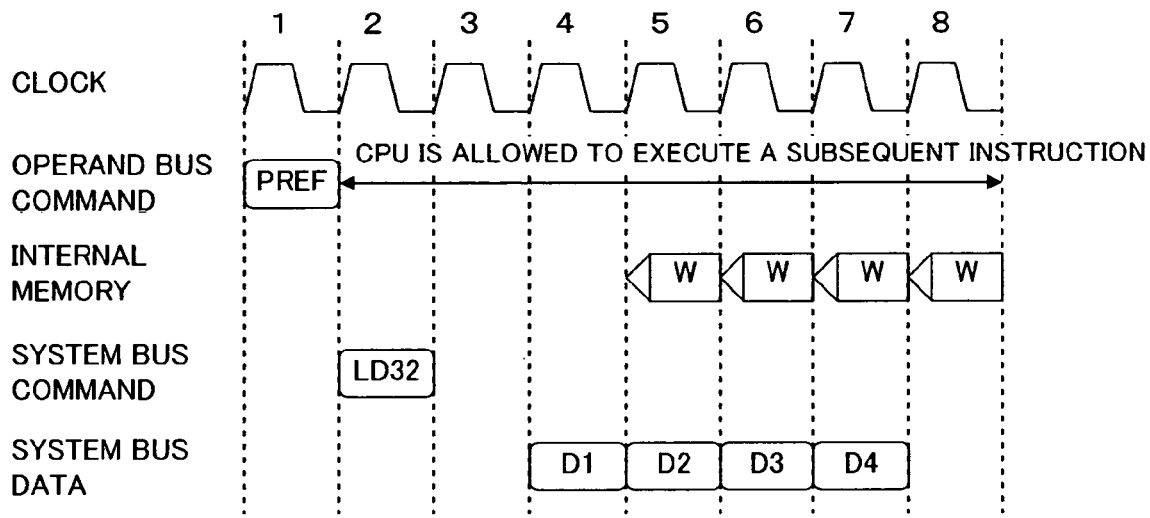
FIG. 5 is a timing chart exemplarily showing timings of the transfer action from an external memory to an internal memory according to a PREF instruction.

FIG. 5 shows a timing chart of the transfer action from the external memory to the internal memory 5 according to the PREF instruction. The embodiment will be described, where the data transfer block size is 32 bytes, and the width of each bus is 64 bits, for example.

When the CPU 1 executes the PREF instruction which involves a virtual address for directing the internal memory 5, the CPU 1 issues a PREF command to the operand bus 20. The block transfer control unit 12 receives the command, and then issues a 32-byte block read command LD32 to the system bus 22 through the BIC 6. Thereafter, at the time when read data is returned, the data is written into the internal memory 5. Here, the PREF instruction is only intended to initiate the block transfer; the CPU 1 is capable of executing a subsequent instruction during actual data transfer.

Figure 6:
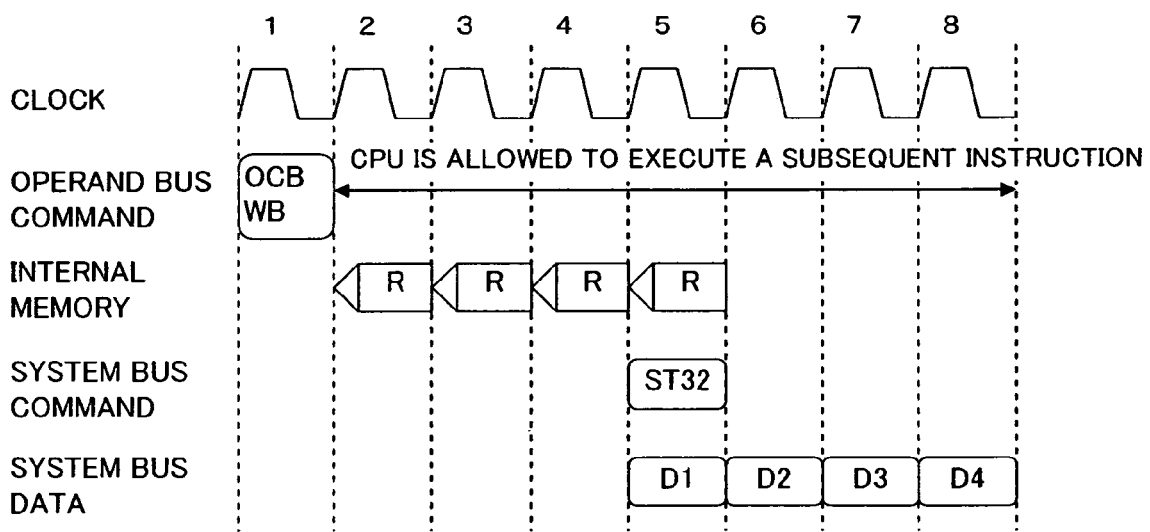
FIG. 6 is a timing chart exemplarily showing timings of the transfer action from the internal memory to the external memory according to an OCBWB instruction.

FIG. 6 exemplarily shows a timing chart of the transfer action from the internal memory 5 to the external memory according to the OCBWB instruction.

When the CPU 1 executes the OCBWB instruction which involves a virtual address for directing the internal memory 5, the CPU 1 issues an OCBWB command to the operand bus 20. The block transfer control unit 12 receives the command, and reads out transferred data from the internal memory 5. After that, a 32-byte block write command ST32 is issued to the system bus 22 through the BIC 6. Here, the OCBWB instruction is only intended to initiate the block transfer; the CPU 1 is capable of executing a subsequent instruction during actual data transfer.

The function of controlling data transfer between the internal memory 5 and external memory according to the block data transfer control unit 12 allows the data transfer between the internal memory 5 and external memory to be speeded up. When the block transfer size is 32 bytes, the conventional transfer according to a load/store instruction of a CPU has required that a 32-bit transfer instruction be executed sixteen times (i.e., eight times for loading and eight times for storing) in order to transfer e.g., 32-byte data, whereas the block data transfer control unit 12 allows such transfer to be carried out by once executing the PREF instruction or OCBWB instruction. Since the DMAC 13 is not required for such block transfer, the overhead owing to the synchronization is not increased regardless of whether the transfer volume is large or small. Therefore, it is possible to increase the speed and efficiency of data transfer between the internal memory 5 accessible by the CPU 1 and the external memory. In the example of FIG. 1, the external memory is the RAM 26 or ROM 25.

In regard to the PREF instruction and OCBWB instruction for initiating the above-described block transfer, the operation on the cache memories 4, 7 and the operation on the data transfer between the internal memory 5 and the external memory are identical with each other in operation code. In addition, TLBs are utilized to associate a virtual address with a physical address as with an ordinary external memory. Therefore, it is easy to select whether to utilize the operand cache memory 7 or utilize the internal memory 5 when a program is prepared. This is because the selection can be made only by setting the virtual address that the program will access at a cachable area or noncachable area. It is also easy to change the virtual address that the program will access between a cachable area and a noncachable area according to the result of its program debug or system debug.

Figure 7:
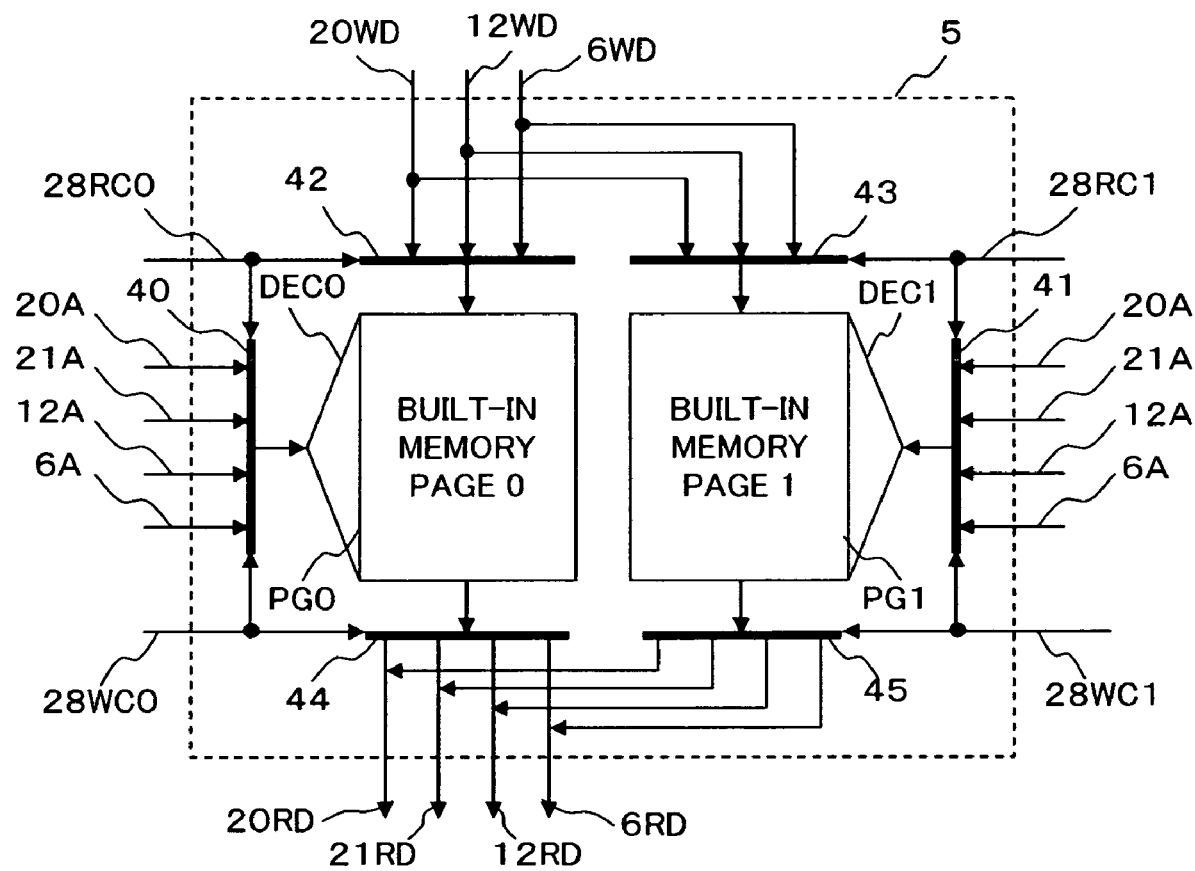
FIG. 7 is a block diagram exemplarily showing a configuration of the internal memory with its storage region divided into two pages.

FIG. 7 exemplarily shows a configuration of an internal memory 5 with its storage region divided into two pages. "Divided into two pages" means to be divided into two memory blocks accessible in parallel. In the example of FIG. 7, the internal memory 5 is divided into two, i.e., a memory block PG0 constituting PAGE 0 and a memory block PG1 constituting PAGE 1, which are accessed independently. DEC0 and DEC1 indicate address decoders. 40 and 41 indicate input bus address selectors. 42 and 43 indicate write bus selectors. 44 and 45 indicate readout bus selectors. The respective memory blocks PG0, PG1 can be accessed by an instruction bus address 21A, an operand bus address 20A, an address 12A from the block transfer control unit 12, and an address 6A from the BIC 6. In regard to written data, data 20WD from the operand bus 20, data 12WD from the block transfer control unit 12, and data 6WD from the BIC 6 are writable. In regard to readout access, the read data are data 21RD for the instruction bus 21, data 20RD for the operand bus 20, data 12RD for the block transfer control unit 12, and data 6RD for the BIC 6. From which of these an access is executed in a certain cycle depends on select signals 28RC0, 28RC1, 28WC0, and 28WC1 from the cache/internal memory control unit 11.

Dividing the internal memory 5 into a plurality of pages like this allows the CPU 1 to freely access any of the pages except a certain page in the middle of the execution of block transfer.

Figure 8:
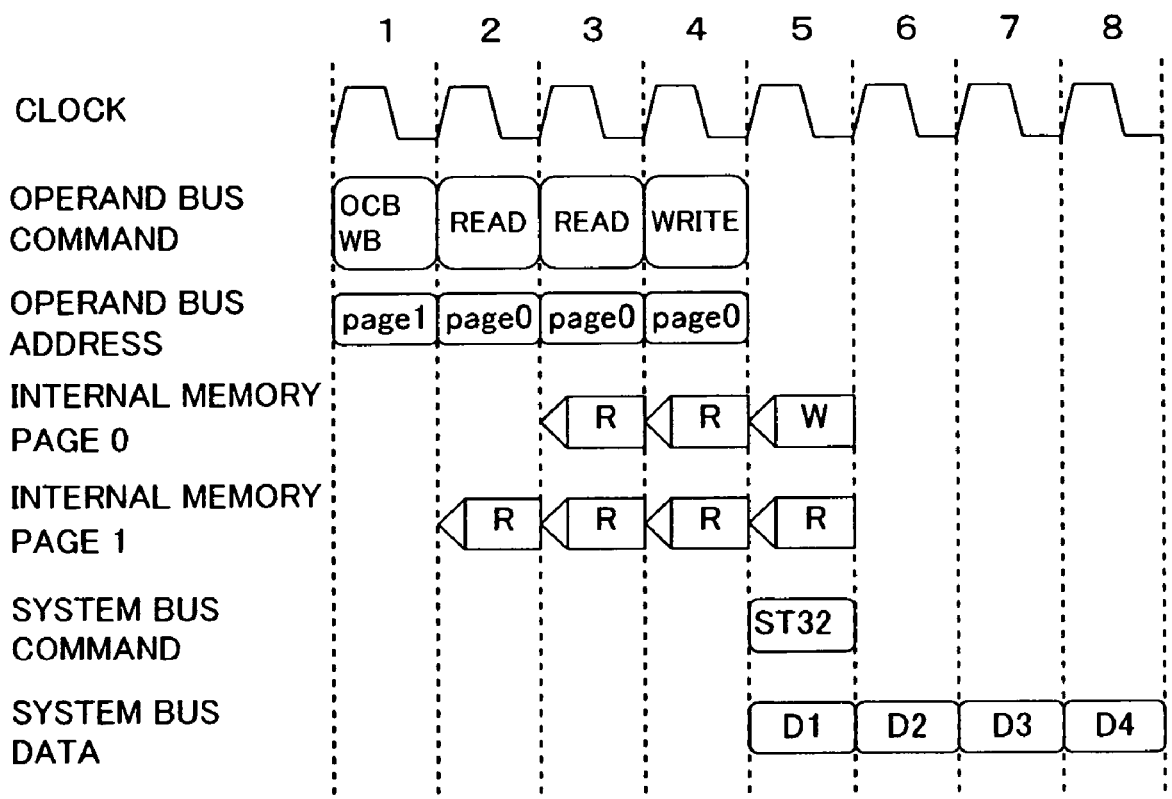
FIG. 8 is a timing chart exemplarily showing timings of parallel actions with respect to the two pages of the internal memory.

FIG. 8 exemplarily shows a timing chart on parallel actions on the two pages of the internal memory 5. In this example, after the block transfer on PAGE 1 (PG1) has been initiated by the OCBWB instruction, the CPU 1 accesses PAGE 0 (PG0). As shown in the drawing, even when the block transfer on PAGE 1 (PG1) is being executed, the access to PAGE 0 (PG0) from the CPU 1 can be executed with no interference.

Figure 9:
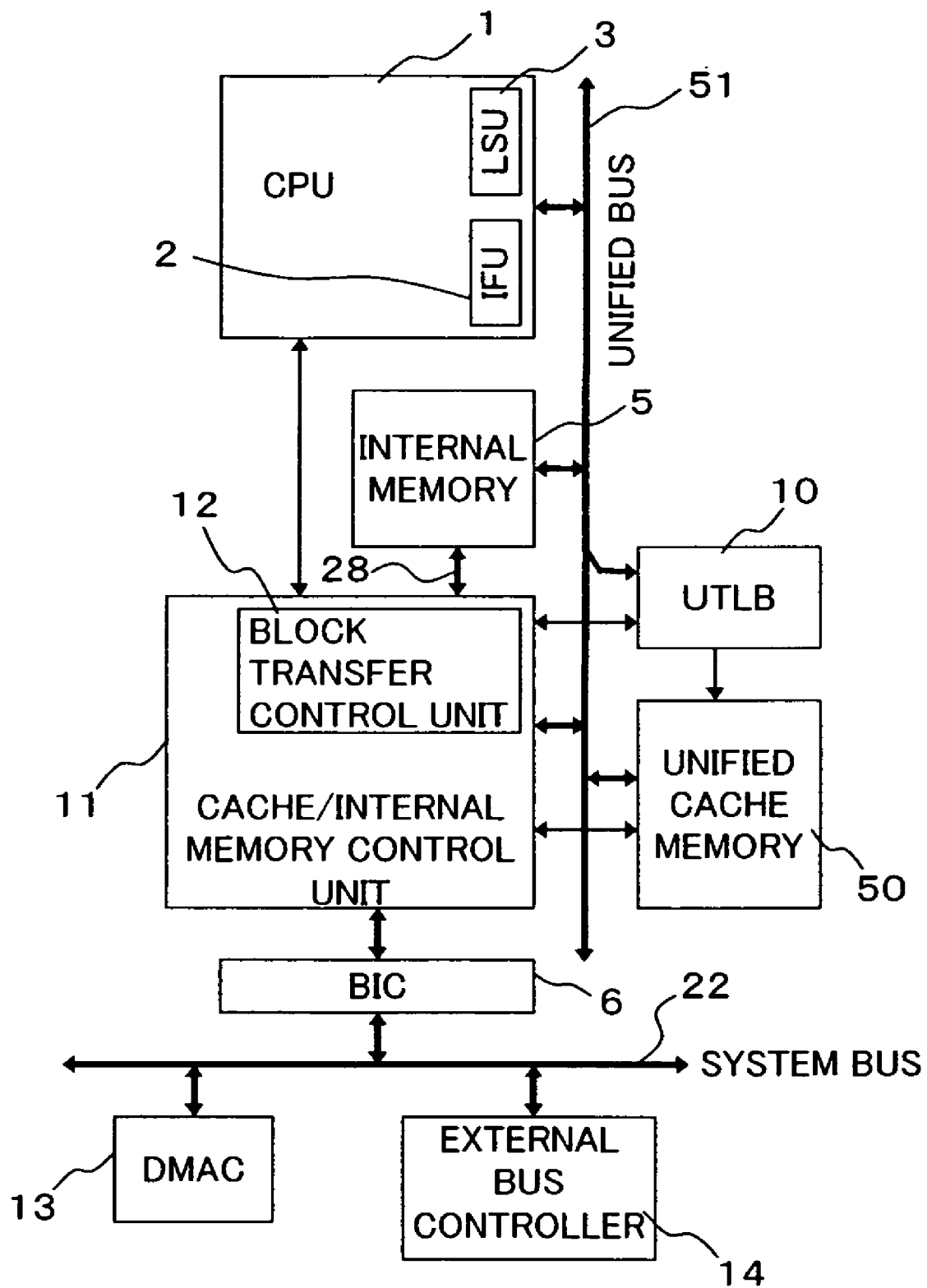
FIG. 9 is a block diagram exemplarily showing a main part of the microprocessor with its cache memory constituted by a mixed unified cache memory for an instruction and operand.

FIG. 9 exemplarily shows a main part of the microprocessor with its cache memory constituted by a mixed unified cache memory for an instruction and operand. In this example, a unified cache memory 50 capable of retaining both an instruction and an operand is provided instead of independently providing the instruction cache memory 4 and operand cache memory 7. In this case, IFU 2 and LSU 3 carry out access through the unified bus 51. Instruction access and operand access never take place at a time and as such, only a UTLB 10 constitutes a TLB.

This example is narrower in the access band of the CPU 1 compared to the configuration of FIG. 1. However, when a cache memory having the same capacity is used, a higher hit rate can be expected compared to the separate cache memories shown in FIG. 1, and the execution efficiency of a program such that an instruction is rewritten by itself can be increased because an instruction and an operand are retained by the same cache memory. Other configurations are the same as those of FIG. 1, and therefore detailed descriptions thereof are omitted. In FIG. 9, illustrations of the external bus controller 14 and the external bus 24 are omitted. Other circuit modules, illustrations of which are omitted, may be provided if required.

Figure 10:
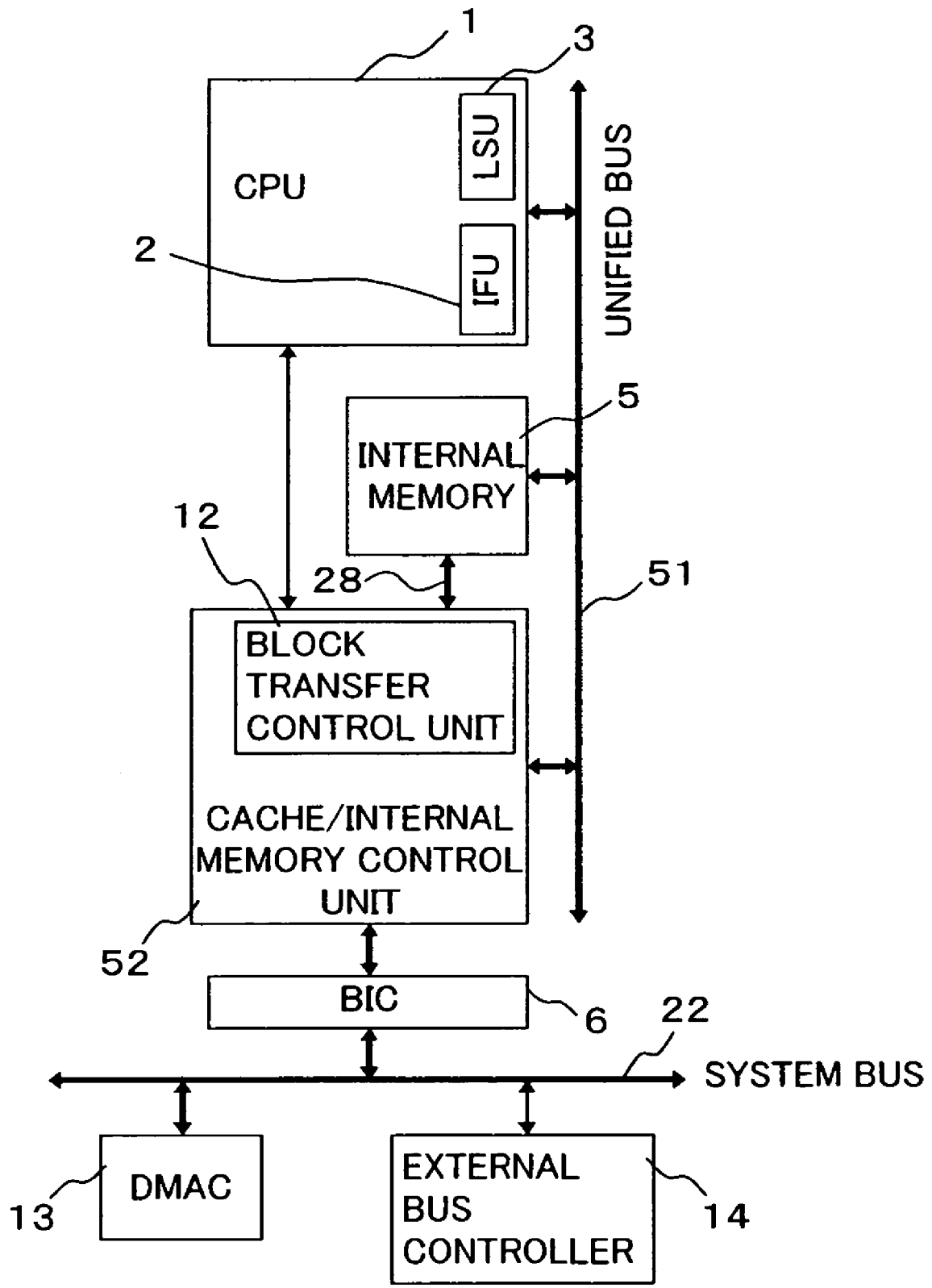
FIG. 10 is a block diagram showing, as an example, still another microprocessor having no cache memory and no TLB mounted therein.

FIG. 10 shows, as an example, still another microprocessor having no cache memory and no TLB mounted therein. The microprocessor shown in the drawing is an example intended for the case where the effect of a cache memory cannot be expected very much, such as the application of a controller tailored to controlling use. In the case of this example, there is no cache memory and as such, an internal memory control unit 52 is mounted therein instead of the cache/internal memory control unit 11. Also, in this case the block transfer control unit 12 implements the block transfer control function with a particular instruction as it do with the prefetch instruction or writeback instruction.

Even with the configuration with no cache memory like this, the same effect as described above speeds up the data transfer between an internal memory 5 and an external memory and as such, high memory access performance can be achieved. In this example, since there is mounted no TLB, one physical address for the block transfer according to the invention always takes on a value in the transfer source's address register or in the transfer destination's address register. The other physical address is specified based on an addressing field of an instruction.

While the invention made by the inventor has been specifically described based on the embodiments above, the invention is not so limited, and various modifications and changes may be made with in a scope which does not depart from the subject matter thereof.

For example, an on-chip circuit module of the data processor may be omitted from or appropriately added to what has been described above. If the DMAC is omitted for instance, the chip area can be made smaller without degrading the access performance with respect to an internal memory. Also, configurations of the internal buses, etc. may be modified and changed appropriately. The cache memory is not limited to the arrangement in which its indexing is performed through a virtual address and the comparison of tag information is performed through a physical address. Also, both the indexing and the comparison of tags may be performed through virtual addresses. Further, in the case where no virtual address is used, the cache memory may be a physical address cache. Still further, in addition to the internal memory 5 using a particular instruction, there may be another internal memory which is connected to the system bus 22 and undergoes a normal access. ENABLE and DISABLE according to MMU does not have to be selectable. Also, in regard to TLBs, the invention is not so limited that the ITLB, OTLB, and UTLB work separately, and one TLB having the same functions as those TLBS may be used instead.

The invention is useful when applied to general purpose processors, application-specific processors (e.g., media processors), etc. and is suitable for a processor with an enhanced DSP function, the main application of which is streaming data processing of moving images, sounds, etc., and the like. Otherwise, the invention may be widely applied to data processors including various microcomputers.

What is claimed is:

1. A data processor comprising:
   a CPU;
   an internal memory accessible by said CPU; and
   a control circuit capable of responding to a particular access request issued by said CPU to control a block transfer, in which said internal memory is used as a first transfer object;
   a cache memory coupled to a first bus which is coupled to said CPU, said internal memory, and said control circuit; and
   a bus interface controller connected to said control circuit, and operable to perform interface control for a second transfer object,
   wherein a set of instructions for said CPU includes a particular instruction for making said CPU issue the particular access request,
   the particular instruction has an address field,
   when an address specified by the address field is a logical address mapped to said internal memory, the address is set as one of a transfer source address or a transfer destination address of the block transfer, and
   a transfer source address or transfer destination address for said second transfer object of the block transfer is a physical address corresponding to a logical address of said address field,
   said internal memory is assigned a cache non-object address for said cache memory,
   the particular instruction includes a first cache memory-operating instruction, and
   when the logical address specified by the address field directs a cache object address for said cache memory, the first cache memory-operating instruction causes an operation of making said cache memory retain data of an external memory associated with the physical address corresponding to the different logical address, at a cache object address specified by the logical address.

2. The data processor of claim 1, wherein the particular instruction includes a second cache memory-operating instruction, and
   when the logical address specified by the address field directs a cache object address and a cache hit is detected at a data location specified by the logical address and a cache entry associated with the cache hit is dirty, the second cache memory-operating instruction causes an operation of writing back to the external memory.

3. The data processor of claim 1, wherein the particular instruction has an operation code identical to that of the first cache memory-operating instruction, and sets the cache non-object address of the address field as the destination address.

4. The data processor of claim 2, wherein the particular instruction has an operation code identical to that of the second cache memory-operating instruction, and sets the cache non-object address of the address field as the source address.

5. The data processor of claim 1, wherein said control circuit is capable of performing memory control in regard to a cache hit and a cache miss with respect to said cache memory.

* * * * *